United States Patent [19]

Battarel et al.

[11] Patent Number: 4,504,098
[45] Date of Patent: Mar. 12, 1985

[54] ELECTROMAGNETIC BEARING FOR HIGH TEMPERATURE ENVIRONMENT

[75] Inventors: André P. Battarel; Claude G. Lequin, both of Vernon, France

[73] Assignee: Societe Europeenne de Propulsion, Puteaux, France

[21] Appl. No.: 548,624

[22] Filed: Nov. 4, 1983

[30] Foreign Application Priority Data

Nov. 16, 1982 [FR] France ................................ 82 19168

[51] Int. Cl.³ ............................................ F16C 39/06
[52] U.S. Cl. .................................. 308/10; 174/117 M; 310/208
[58] Field of Search ...................... 308/10; 310/42, 45, 310/271, 208, 184; 174/117 M

[56] References Cited

U.S. PATENT DOCUMENTS 3,600,801  8/1971  Larsen ................................... 310/42
3,749,950  7/1973  Lenz ..................................... 310/271
4,128,795  12/1978 Habermann ........................... 308/10
4,245,869  1/1981  Scheffer ............................... 308/10

Primary Examiner—R. Skudy
Attorney, Agent, or Firm—Fitzpatrick, Cella, Harper & Scinto

[57] ABSTRACT

Electromagnetic bearing within a high temperature environment. The bearing comprises electromagnets, each one constituted by at least one coil made of conductors, and one armature in ferromagnetic material. Each coil is produced by weaving and comprises a warp constituted from at least one insulated conducting wire and a weft constituted from a strip of insulating material, the whole coil assembly being thereafter molded in a high temperature cement.

10 Claims, 7 Drawing Figures

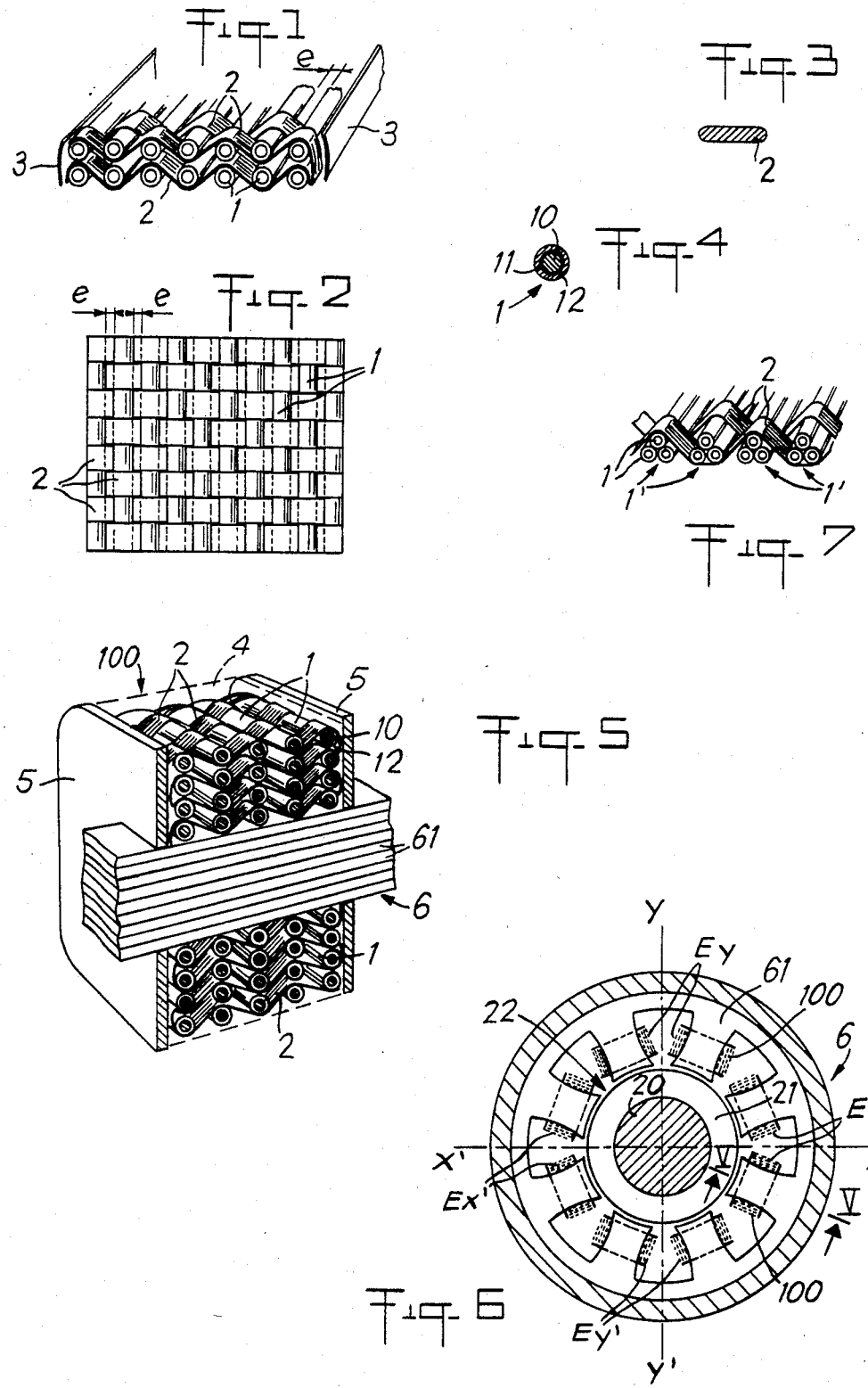

ELECTROMAGNETIC BEARING FOR HIGH TEMPERATURE ENVIRONMENT

The present invention relates to an electromagnetic bearing designed to be placed in a high temperature environment and comprising electromagnets, each one constituted of at least one coil and one armature in ferromagnetic material.

The structure of a magnetic bearing is now well-known and the applications of such bearings continue to extend. For a number of special conditions of operation, the conventionally known structure of magnetic bearings has not proved completely satisfactory and has been found rather fragile.

This is the case for example, when a magnetic bearing is designed to be used in a machine inside which very high temperatures prevail. For example, inside a high-temperature reactor comprising a blast-engine working with hot helium, the end of a shaft may be brought to temperatures of about 1000° C. and the bearings to temperatures of around 400° and 500° C. With such working conditions, it has been proposed already to mold the coils in a high temperature cement in order to produce a massive block which is more able to withstand the action of heat. Under repeated thermal shocks, the block of cement tends however to crack and short-circuits may occur inside the coil, the wires of which are only very slightly insulated.

It is the object of the present invention to overcome the aforesaid disadvantages and to enable the production of magnetic bearings working reliably even when they are fitted inside an environment of high temperature.

This object is reached due to the fact that according to the invention, each coil is produced by weaving and comprises a warp constituted from at least one insulated conducting wire and a weft constituted from a strip of insulating material, the whole coil assembly being thereafter molded in a high temperature cement.

A woven coil, in which the different turns of one particular conducting wire are held one with respect to the other in specific relative positions, and without contacting, permits to eliminate definitely all possibility of short-circuits, even if under the action of thermal or mechanical shocks, the cement block cracks or if the insulating wire layer of the coil is damaged.

Thus the warp wire and the weft tape of the coil are woven loosely, providing interstices which help the penetration of the molding cement.

Advantageously, the insulated conducting wire is constituted by a nickel-plated copper wire insulated by a layer of ceramics, wich can in turn be coated with a layer of varnish which is designed to prevent the ceramics layer from becoming detached during the winding operation.

The tape of insulating material can be a tubing of glass-fiber.

The coil according to the invention is easy to manufacture from an assembly composed of grouped wires connected in parallel, presented for example as a twine, which is woven with the insulating tape. A blotter-like ceramic, or any other heatwithstanding material such as glass-wool can also be placed on the side portions of the coil between the ends of the insulating tape (not shown in the drawings).

The invention will be more readily understood on reading the following description with reference to the accompanying drawing in which:

FIG. 1 is a perspective view of part of the coil weave of an electromagnetic bearing according to the invention, FIG. 2 is a diagrammatical plan view of the coil weave shown in FIG. 1, FIG. 3 is a cross-section of a tape usable to produce a coil weave according to FIGS. 1 and 2, FIG. 4 is a cross-section of a conducting wire usable in the coil shown in FIGS. 1 and 2, FIG. 5 is a perspective cross-section along line V—V of FIG. 6, FIG. 6 is a diagrammatical view taken in a radial plane of one example of electromagnetic bearing to which the invention can be applied, and FIG. 7 is a partial diagrammatical view showing a variant embodiment of FIG. 1 with assemblies of grouped conducting wires.

FIG. 1 shows how, in principle, a woven coil is produced according to the invention. An insulated conducting wire 1 forms a warp, whereas an insulating tape 2 constitutes the weft of the weave formed by interweaving the wire 1 and tape 2. The weaving is relatively loose and a space e is provided between two adjacent turns of the conducting wire 1 to produce interstices facilitating the penetration of a coating cement which is designed to produce a massive block around the weave. However, even in the event of cracks appearing in the massive block, the formed weave keeps relatively fixed distances e between two adjacent turns of the conducting wire 1 so that said turns are never contacting with one another. In practice, the different adjacent turns of a layer are produced successively from a single wire or from an assembly of wires and every time, the tape 2 is inserted between adjacent portions of wire.

The insulating tape 2 which is used as a weft designed to hold the turns of the conducting wire in well-defined respective positions can be constituted by a tubing in braided glass-fiber. The thickness of tape 2 is about a few tenth of a millimeter, for example 0.5 mm, and its width is a few millimeters for example 2 mm (see FIG. 3).

The conducting wire 1 (FIG. 4) is advantageously constituted by a copper core 10 coated with a layer 11 of nickel, which layer is itself coated with an insulating layer 12 of ceramics. A varnish can also be coated over the insulating layer 12 to prevent same from becoming detached during the winding operation. The diameter of the core 10, 11 in nickel-plated copper, of the wire 1 is about a few tenths of a millimeter and remains preferably under one millimeter. In those cases where strong energies are required, a plurality of wires 1 are grouped in parallel and form a unit 1' (see FIG. 7). It is thus possible to easily avoid using conducting wires of too large a diameter which are always difficult to wind, and to reduce the radius of curvature of the coil 100.

FIG. 5 shows a coil 100 with several layers of insulated conducting wire 1 interwoven with a flat insulating tape 2 which keeps a pre-set distance between two adjacent turns produced from the insulated conducting wire 1. The coil 100 which is produced around a yoke 6 composed of a stack of ferromagnetic plates 61, is molded in a high temperature cement 4, which, due to the interstices provided between the different wires 1 kept apart one from the other by the tape 2, can be distributed evenly throughout the coil.

In case of repeated thermal shocks, cracks appear in the molded-over part 4, but the weave nonetheless provides a good mechanical strength to the coil and preserves the insulation even though the ceramic layer 12 on the wire 1 may be partly damaged. The weaving indeed ensures permanent cohesion of the massive block 4, even if the latter is cracked. Thus the present invention permits to use ordinary insulated conducting wires, even relatively fragile wires capable of having their ceramic insulation damaged under the effect of thermal shocks, without this affecting the good operation of the assembly due to the distances which are permanently kept between the turns of the wire 1 of the coil 100.

In the side portions of the winding, and in particular close to the side walls 5 of the covering 4 (FIG. 5), a ceramic blotter can be inserted to increase the quality of the insulation. Any other material withstanding heat, such as glass-wool can also be used.

As already indicated, it is possible when effecting the weaving to use a single conducting wire 1 or a single group 1' of wires 1 connected in parallel, to form not only adjacent portions of wires in one single layer, but also to form successively several superimposed layers of the coil. The turns of each layer can then be offset with respect to the corresponding turns of the adjacent layers.

FIG. 6 shows, in the radial plane of the device, a shaft 20 supporting an annular armature 22 constituted of laminated sheet-metal 21, a stator of providing an electromagnetic bearing comprising a yoke 6 composed of laminated sheet-metal 61 and having four pairs (Ex, Ex', Ey, Ey') of poles around which are wound the coils 100 according to the invention. Each one of the coils 100 may be composed of a plurality of layers of wire 1 woven with a flat tape 2, as shown in FIG. 5. The electromagnetic bearing assembly is thus adapted to withstand very high temperatures.

What we claim is:

1. Electromagnetic bearing for a high temperature environment, comprising stator means and rotor means, said stator means including at least one electromagnet having a ferromagnetic stationary yoke and a coil assembly attached thereto, said coil assembly comprising at least one coil wound on said stationary yoke and said rotor means including an annular ferromagnetic rotor armature, wherein each said coil comprises at least one insulated conducting wire defining a warp and an interwoven strip of insulating material defining a weft and wherein the insulated conducting wire and the interwoven strip of insulating material are embedded in a high temperature cement.

2. Electromagnetic bearing as claimed in claim 1, wherein the insulated conducting wire is constituted by a nickel-plated copper wire insulated by a ceramic layer.

3. Electromagnetic bearing as claimed in claim 1, wherein the strip of insulating material is constituted by glass-fiber tubing.

4. Electromagnetic bearing as claimed in claim 1, wherein said insulated wire comprises a conducting core, having a diameter less than about 1 mm.

5. Electromagnetic bearing as claimed in claim 1, wherein said strip of insulating material has a thickness of a few tenths of a millimeter, and a width of about a few millimeters.

6. Electromagnetic bearing as claimed in claim 1, wherein blotter-forming ceramic is provided over the side parts of the coil, between the ends of the weft strips of insulating material.

7. Electromagnetic bearing as claimed in claim 2, wherein said nickel-plated copper wire insulated by a ceramic layer comprises an additional outer coating of varnish to prevent the ceramic layer from becoming detached during winding.

8. Electromagnetic bearing as claimed in claim 1, wherein interstices are provided between the warp insulating conducting wire and the interwoven weft strip of insulating material and said interstices are filled with said high temperature cement.

9. Electromagnetic bearing as claimed in claim 1, wherein each coil comprises a plurality of insulated conducting wires grouped together and connected in parallel, and a strip of insulating material interwoven with said plurality of insulated conducting wires.

10. Electromagnetic bearing as claimed in claim 1, wherein blotter-forming glass-wool is provided over the side parts of the coil.

* * * * *

UNITED STATES PATENT AND TRADEMARK OFFICE
CERTIFICATE OF CORRECTION

PATENT NO. : 4,504,098

DATED : March 12, 1985

INVENTOR(S) : ANDRE P. BATTAREL, ET AL.

It is certified that error appears in the above-identified patent and that said Letters Patent is hereby corrected as shown below:

Column 1, line 54, change "wich" to --which--.

Claim 6, line 3 (Column 4, line 25), change "strips" to --strip--.

Signed and Sealed this

Twenty-fifth Day of June 1985

[SEAL]

Attest:

DONALD J. QUIGG

Attesting Officer

Acting Commissioner of Patents and Trademarks